Dec. 20, 1960 F. C. WIESINGER Re. 24,912

PATTERN MEANS FOR KNITTING MACHINES

Original Filed Feb. 17. 1956 2 Sheets-Sheet 1

INVENTOR.
FREDERICK C. WIESINGER

BY Rodney C. Smithwick

ATTORNEY

PATTERN MEANS FOR KNITTING MACHINES

Original Filed Feb. 17, 1956 2 Sheets-Sheet 2

INVENTOR.
FREDERICK C. WIESINGER
BY
Rodney C. Southworth
ATTORNEY

United States Patent Office

Re. 24,912
Reissued Dec. 20, 1960

24,912

PATTERN MEANS FOR KNITTING MACHINES

Frederick C. Wiesinger, Feasterville, Pa., assignor to Wildman Jacquard Co., Norristown, Pa., a corporation of Pennsylvania Original No. 2,814,937, dated Dec. 3, 1957, Ser. No. 566,132, Feb. 17, 1956. Application for reissue July 5, 1960, Ser. No. 40,983

9 Claims. (Cl. 66—50)

Matter enclosed in heavy brackets [ ] appears in the original patent but forms no part of this reissue specification; matter printed in italics indicates the additions made by reissue.

This invention pertains to a novel mechanism for selecting knitting instrumentalities such as the needles of an independent needle knitting machine.

It is a general object of the invention to devise pattern control means for knitting machines which shall be effective for determining the most intricate and extensive patterns or effects in the fabric, which shall be relatively simple and dependable and which shall make possible a greater number of independent feeding stations for a machine of given diameter of needle cylinder.

A more specific object is that of improving the pattern mechanism of circular Jacquard knitting mechanisms so that the pattern drums and their patterns shall be rotated and advanced continuously and at a uniform rate at such times in the cycle as a pattern or control for knitting instrumentalities is being used.

A further object is that of providing means of the type described wherein the pattern drums and attendant driving means are continuously rotated when in use thereby to make unnecessary the more complicated and more expensive intermittent motions heretofore utilized.

A more specific object is that of imparting to a series of instrumentality selectors and actuators a wave-like motion both during their selecting motion and while they are being returned to inactive position.

Another object is that of shortening or compressing the angular space about the machine during which or within which a selector or group of selectors controlled by one independent pattern may pass through both a selecting movement and a return motion thereby to bring closer together adjacent cams which act upon these selectors and thus, to increase the number of independent feeding and knitting stations about the machine.

Other objects will become apparent from the following, more detailed disclosure.

In circular, independent needle, knitting machines such, for example, as the circular Jacquard machines one of which is illustrated in United States Patent 2,082,127, a plurality of selecting units are mounted about the machine cylinder and base each of which comprises among other parts, a drum and a pattern passing over and advanced by the drum. These patterns are in endless strip form having perforations adapted to align with a number of parallel slots cut in the drum. The drum is intermittently advanced carrying the pattern with it, and at each step the pattern is read by a series of selector levers having pattern feeling pins or the like, the selectors if rendered effective by the pattern, acting by further influence of a selector cam to move a needle or other instrumentality as intended to effect the knitting of a pattern or to produce some other intended fabric variation.

These selectors are preferably of the general type shown in United States Patent 2,281,721, and actually, due to the intermittent motion of the drum, a group of them are moved to selecting position as a unit, that is, as many as may be influenced by a single pattern and drum, must all be pressed in after one selector cam has passed that group and before the next has reached it. In addition some angular space between such cams is needed to give time for the return of the selectors although they are returned almost as soon as a cam has released them. Such angular space is also needed for the length of a cam itself and for operation of the drum advancing means, heretofore, a rosette or modified Geneva motion.

Thus the adjacent spacing or proximity of cams and therefore feeds, is definitely limited since for economy of parts and cost and to keep as simple as possible a relatively complicated mechanism, each drum should be reasonably long and its pattern correspondingly wide. Actually such machines of large diameter have been limited to a maximum of twelve feeding stations. The factor which has contributed most to this wide spacing of selector cams is that incidental to a selecting motion involving all of one group of selectors at once, or that attendant upon the intermittent drum movement.

Now, in the improved means of which this is a disclosure, the above mentioned disadvantages are overcome by a novel combination of parts and mode of operation in which all drums and patterns are continuously and uniformly rotated or advanced. The drums themselves are driven by suitable gearing or otherwise, so that, while a pattern or other fabric variation is being effected, they are continuously rotated. Their surfaces are formed with slots or indentations into which feeler members may extend according to the pattern and these are inclined to the length of the drum, preferably along a helix of very great lead. These drums advance a pattern of endless type such as a Verdol strip in which perforations or other surface deformations are formed and which are likewise inclined to a line perpendicular to the strip length and spaced to align with the slots in the drum.

Pattern sensing or reading means of the type shown in United States Patent 2,281,721 or other equivalent is employed to convey the pattern indications to the instrumentalities. These are, of course, acted upon by suitable cams to complete their selecting function. Since the pattern indicia and cooperating drum slots are formed as described and since the pattern is continuously advanced there are always some selectors which are reading the pattern, some being pushed in to engage their selector cam and, of course, some being released by a cam to return to inactive position in readiness for further selection. Thus there is a continuous wave of selectors rather than a movement en masse as has heretofore been the case.

The invention will be described in detail by reference to one specific embodiment thereof as illustrated in the accompanying figures of drawing, wherein.

Figure 1:
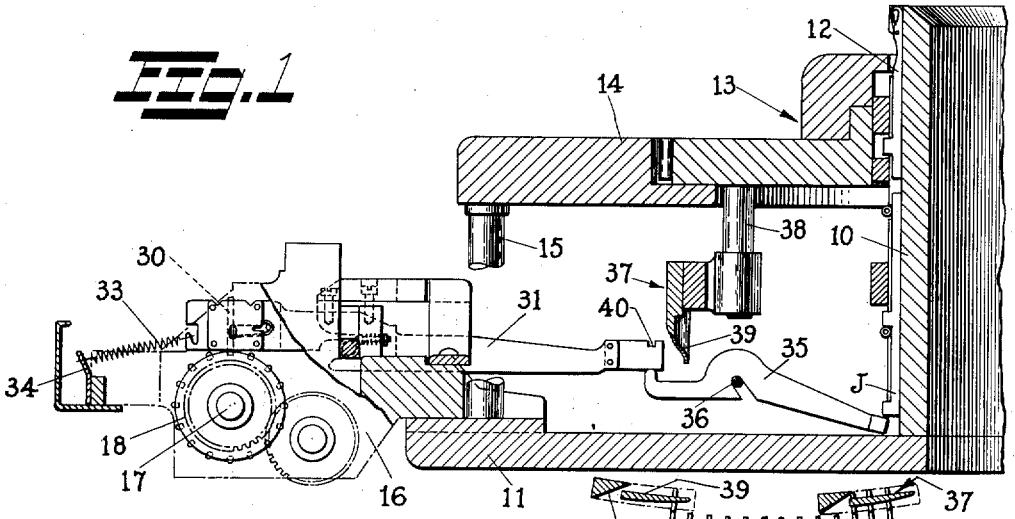
Fig. 1 is a section through a part of a knitting machine to which the invention has been applied.

Now referring to Fig. 1, the invention is applied to a circular, body type machine having a cylinder 10 supported on a base 11 and slotted in the usual way for the accommodation of needles 12 which may be of latch or any other type slidable in their slots and capable of varying control for knitting, tucking or welding or otherwise being specially controlled to effect patterning or stitch variation. A dial (not shown) may or may not be employed, and, of course, the invention applies to double cylinder machines and to practically all independent needle knitters in which there is a relative motion between cams and instrumentalities.

Here jacks J are provided for needles and, of course, needles and the jacks have one or more butts for reasons understood by those skilled in the art.

While needles and jacks are cited herein as the instrumentalities which are selected, the invention applies as well to selection of sinkers, pressers, transfer instruments and to all others.

A cam ring 13 having cams for knitting and other purposes is rotatable in a recess in cam plate 14 held on a plurality of posts 15. Ring 13 is driven by gearing from power means in a known manner. A dial, if employed, may be held in any convenient way and its dial cams driven through mechanism as in the Patent 2,082,127, cited above.

Figure 2:
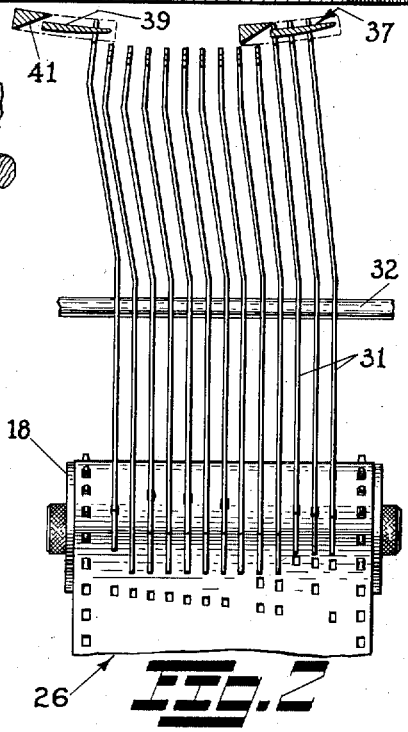
Fig. 2 is a plan view of a drum, pattern and selectors.
Figure 3:
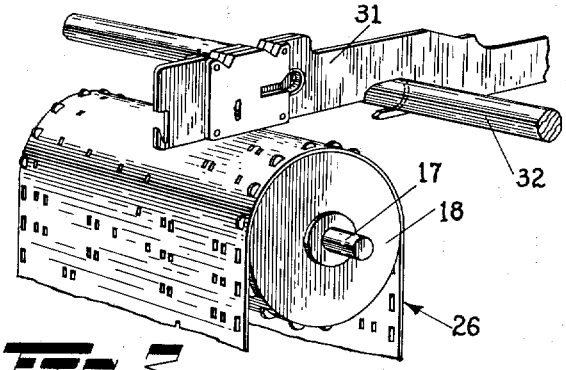
Fig. 3 is a perspective view of a drum, pattern and one selector.
Figure 4:
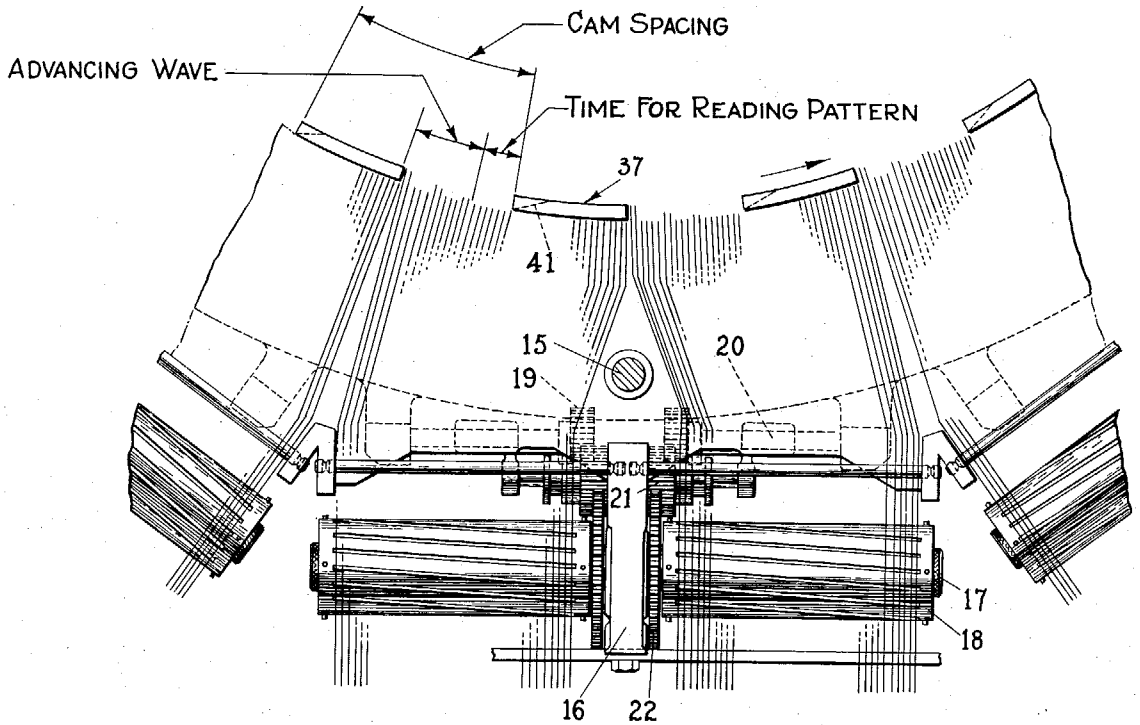
Fig. 4 is a more or less schematic view of selector units as applied to a knitter showing the selecting action.

As shown in Figs. 2, 3 and 4 as well, a double drum and pattern selector unit is mounted on base 11, and it is to be understood that a plurality of such units are usually provided extending about the entire base, the number depending upon the size of the machine.

This unit includes a bracket 16 at each side of which there is journaled on a spindle 17 a pattern drum 18. While each unit is a double one and a drum and pattern with selectors is to be found at either side of the brackets, and differ only in being set up as rights and lefts, these are so close to being duplicates that one only will be described in detail.

Drum 18 is driven by gearing including a pinion 19 on a shaft 20, idler 21 and gear 22 fixed to the end of drum 18. Normally, the shafts 20 of which there is one for each double unit, are driven from a common drive shaft and are interconnected. They rotate continuously and if the idler 21 is in mesh with both the pinion and gear 22, the drum is rotated continuously.

A series of controls are suitably actuated, for example, as in United States Patent 2,082,127, to slide the idler 21 into and from mesh with the gear 22. This permits the pattern action to be arrested at such times as it is not needed.

Figure 5:
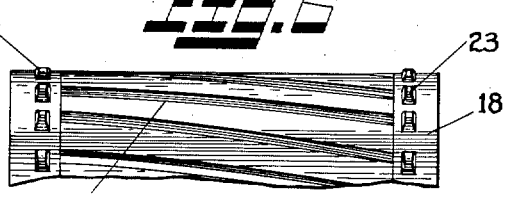
Fig. 5 is a detail view of a part of a drum.

Drum 18 is preferably cylindrical and is provided with sprocket teeth 23 and 24 at its ends, Figs. 3 and 5, and a plurality of indentations preferably in the form of continuous slots 25. These slots are actually helical in form and they are angled so that, as will hereinafter appear, the selectors controlled by them are projected inwardly in a wave of such steepness that all functions which must take place in a space controlled by a single pattern may do that.

Figure 6:
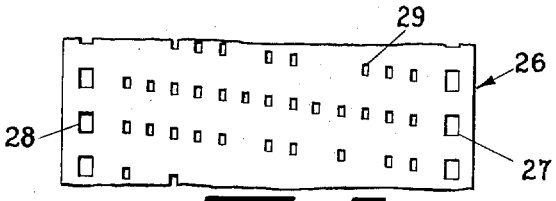
Fig. 6 is a detail view of part of a pattern.

The pattern 26, Figs. 2, 3 and 6, may be any flexible strip such as one of paper or cloth backed paper and has sprocket holes 27 and 28 adjacent its edges and perforations 29 in spaced helically disposed rows which align with and overlie the slots 25 in the drum as the pattern is passed over the latter. These perforations are preferably rectangular in shape and spaced to receive a spring pressed detent 30, Fig. 1, carried by a selector lever 31, of which there are a number for each individual pattern corresponding to the number of instrumentalities spanned by that unit. These selectors are slidable and pivoted at a rod 32, and a spring 33 connected to each selector and to a comb or holder 34 tends to draw them to an inactive position.

The number and disposal of perforations depend upon the pattern. It is intended that there shall be a selector for each instrumentality, but in some instances, it may be of advantage to use them with spaced instrumentalities or with groups thereof.

It is preferred that pattern perforations be rectangular as shown and a thin detent or feeler of similar cross-section is intended, but others such as those of the older circular form may be used.

Each selector 31 has cooperating with it a lever 35 pivoted at 36. Each lever has its inner end extending into a slot beneath its jack J and at the outer ends is so formed as to bear against the under side of selector 31. While not shown, these levers and selectors are guided in comb-like members so that they are maintained in alignment and register, also resist side thrust due to cam action.

For each yarn feeding station there is provided a selector cam which actually moves ahead of the knitting and other cams at that feed. In Fig. 1 such a cam 37 is shown depending from a post 38 carried by cam ring 13. These cams are also shown in Figs. 2 and 4 and comprise a blade 39 which engages in the notches 40 in selector ends, also a return cam surface 41 the function of which is to return selectors quickly after their active function is completed, although of course, the spring 33 would do that anyway but not as quickly. Actually, one supplements the other.

As can be seen in Fig. 4, where a plurality of selector units and their cams are more or less schematically illustrated, the direction of movement of cams being indicated by the arrow, spacing between cams is very considerably cut down over that of Fig. 1 in United States Patent 2,281,-721 which represents the prior art. The actual functions are divided into sectors representing angular cam travel incidental to each. Of course, the selectors operate in a wave and considering a single selector, it will be returned by cam 41 and maintained in inactive position by its spring 33. The small sector "time for reading pattrern" allows the pattern to be moved to a point where a perforation, if the selector is to be pushed in again, will come under the detent or feeler. The feeler drops into the perforation and slot and further rotation of drum 18 carries the selector inwardly on its "advancing wave" to a position in which cam blade 39 engages the selector notch 40. Thus without unduly steep cam contours, it is possible to space the cams 37 much closer than heretofore. Actually a gain of about 50 to 75% is attained so a 12 feed machine may have approximately 18–21 feeds while retaining full selectivity for each instrumentality and while actually simplifying the drum driving means.

The continuous drum rotation does away with the more complicated and expensive intermittent drive and, of course, when once set up for it, the slots and patterns may be formed at an angle as easily as according to the previous practice.

The slots and pattern differ otherwise only in that they are spaced somewhat farther apart. That is necessary since now the advancing wave requires only a portion of the forward motion of the drum and pattern while a cam is moving along only about one-half the distance spanned by a sector corresponding to a single drum and its selectors.

It is to be understood that in the production of some knitted goods such as sweater blanks, the pattern is not produced throughout all the length of material. Known means is used to render the pattern and certain of the cams ineffective at times. The term "continuously rotated" is therefore intended to pertain to rotation of the drum while a pattern or other fabric variation is being effected.

The pattern levers 31 may, if desired, act directly on needles, jacks or other instrumentalities rather than through levers 35 as shown.

The term "selecting" refers to any preliminary action upon certain of the instrumentalities to cause them to assume a different relationship to others so that they may then pass through a different pathway to effect some function not at that time expected from non-selected instrumentalities. In some instances it may be the affected instrumentalities which are considered to produce the pattern while in others the reverse may be true, that is, the selection acts to prevent certain instrumentalities from completing an ornamental or distinguishing stitch.

The term "reading" is used to denote a mechanical sensing of the physical pattern itself and refers specifically to the entry of the detents or feelers into the perforations.

and failure to do so at those areas where no perforations are provided.

The slots in the drums are preferably to be formed on a helix as stated, however, that is not entirely essential and a functional slot cut or otherwise formed at the proper angle to a generatrix of the cylinder surface will suffice and the invention contemplates such a modification.

The cams are preferably the movable members in the machine used by way of example, in which event the cylinder, dial and pattern means are non-rotary, but that may be reversed in instances.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. In an independent needle knitting machine having knitting instrumentalities, means for differently affecting some at least of said instrumentalities which comprises a drum, helically formed indentations extending lengthwise of said drum, means for rotating the drum continuously and a pattern member in the form of a strip passed over and in driven relationship to the drum, surface deformations in said pattern member aligning and cooperating with the indentations in the drum as the strip is passed over and advanced with the drum, and means for reading the surface deformations in the pattern member, and *means which includes the drum and its indentations for* transmitting their indications to the instrumentalities.

2. In an independent needle knitting machine having knitting instrumentalities, means for selecting instrumentalities which comprises a drum, slots extending lengthwise of and helically formed in said drum, means for rotating the drum continuously and a pattern member in the form of an endless strip passed over and in driven relationship to the drum, perforations in said pattern member aligning with the slots in the drum as the strip is passed over and in contact therewith, and means for reading the perforations in the pattern member and [transmitting] *which act in conjunction with the rotating drum to transmit* their indications to the instrumentalities.

3. In an independent needle knitting machine having knitting instrumentalities, means for selecting instrumentalities which comprises a drum, slots extending lengthwise of and helically formed in said drum, means for rotating the drum continuously and a pattern member in the form of an endless strip passed over and in driven relationship to the drum, perforations in said pattern member aligning with the slots in the drum as the strip is passed over and in contact therewith, and means comprising a plurality of selector levers for reading the perforations in the pattern member, means normally resisting movement of said levers, and means forming a part of the levers for entering a perforation in the pattern and slot in the drum *and engageable with that slot* to move the lever a predetermined extent as the drum is rotated.

4. In an independent needle knitting machine having knitting instrumentalities, means for selecting instrumentalities which comprises a drum, *continuous* slots extending lengthwise of and helically formed in said drum, gearing for rotating the drum continuously while said means for selecting instrumentalities is to be effective, a pattern strip passed over said drum, means including sprocket teeth on the drum and sprocket holes in the strip whereby the strip is driven by the drum, and pattern defining perforations in said strip so spaced and aligned as to register with an underlying slot in the drum while the strip is passing about the drum, and means for reading the pattern and *acting from forces imparted by the drum for* transmitting the indications thereof to the instrumentalities.

5. In an independent needle knitting machine having knitting instrumentalities, means for selecting some at least of said instrumentalities which comprises a rotatable member of general cylindrical form, spaced *continuous* slots in said member inclined to a generatrix of the cylinder and extending in a general lengthwise direction thereof, means to rotate the member continuously while effecting a selecting function, a pattern member in the form of an endless strip passed over and advanced with the rotatable member and having a plurality of rows of pattern determining perforations spaced to align with slots in the member as the pattern passes over it, and means for reading the pattern and conveying its pattern determining indications to the instrumentalities *which comprises pivoted levers, means to bias said levers in one direction and other means carried by each lever and adapted to enter a slot in the drum through a perforation in the pattern against its biasing means through its engagement with the slot in the drum.*

6. In a circular, multifeed, independent needle knitting machine having knitting instrumentalities, means for selecting said instrumentalities to control variation of stitch effect knitted thereby which comprises a plurality of selector units spaced about the machine, each of which includes a drum, means common to all units and interconnected for rotating said drums at a uniform rate and continuously during knitting in which stitch variation is effected, spaced slots in the drums, said slots being inclined to a generatrix of the drum surface and a pattern member in the form of an elongated, endless strip of flexible material passed over each drum and advanced thereby, pattern determining perforations in said pattern members aligned with the slots in the drums as the patterns pass thereover, a plurality of selector levers and pattern feeling and reading means at each lever cooperating with each pattern *and adapted to enter a slot in the drum through a perforation in the pattern and to move the lever as the drum is rotated* and means interconnecting the levers to their respective instrumentalities for imparting thereto the pattern determining movements of the levers.

7. For use in a knitting machine having instrumentalities subject to differentiated movements in the production of patterned fabrics, a pattern means for selecting certain of said instrumentalities according to pattern requirements which comprises a drum and means for rotating said drum continuously during the formation of a pattern, slots in the drum extending in a direction generally lengthwise of the drum and inclined to a generatrix of the surface thereof, a pattern member in the form of an elongated, endless strip of flexible material passed over said drum and advanced thereby, pattern determining perforations in said pattern member aligned with the slots in the drum as the pattern passes thereover, and a plurality of selector levers for reading the pattern and transmitting its pattern indications to the instrumentalities *which comprises pivoted levers, means to bias said levers in one direction and other means carried by each lever and adapted to enter a slot in the drum through a perforation in the pattern and to move the lever against its biasing means through its engagement with the slot in the drum.*

8. For use in a knitting machine having instrumentalities subject to movements incidental to selection as for producing patterned fabrics, a pattern means for causing instrumentalities to assume differentiated pathways which comprises a drum and means for rotating said drum at a uniform speed and continuously during patterning, a plurality of spaced *continuous* indentations at the drum surface, each of which is formed at an angle to a generatrix of the drum surface, and a pattern member driven by and in cooperation with said drum having pattern determining indicia as a part thereof, and means *comprising two armed levers, a pivot about which said levers may rock and spring pressed detents carried by one arm of each lever* for sensing the said indicia and in cooperation with the indentations, transmitting such pattern determining indications as are derived therefrom to the instrumentalities.

9. For use in a knitting machine having instrumentalities subject to movements incidental to selection as for producing patterned fabrics, a pattern means for causing instrumentalities to assume differentiated pathways which comprises in combination a drum and endless strip pattern driven thereby, means to rotate said drum continuously at a uniform rate and cooperating indicia in the pattern and aligned indentations in the drum disposed at an angle to a generatrix of the surface of the drum, and pattern sensing means functioning in a selecting wave as governed by the pattern to impart pattern determining indications derived therefrom to the instrumentalities, *said sensing means comprising pivoted levers, means to bias said levers in one direction and other means carried by each lever and adapted to enter a slot in the drum through a perforation in the pattern and to move the lever against its biasing means through its engagement with the slot in the drum.*

References Cited in the file of this patent or the original patent

UNITED STATES PATENTS

| | | |
|---|---|---|
| 1,650,083 | Lombardi | Nov. 22, 1927 |
| 1,872,596 | Lawson et al. | Aug. 16, 1932 |
| 2,281,721 | Sirmay | May 5, 1942 |
| 2,696,092 | Miller | Dec. 7, 1954 |